(12) United States Patent
Liao

(10) Patent No.: US 10,444,772 B2
(45) Date of Patent: Oct. 15, 2019

(54) LEAK DETECTOR STRUCTURE

(71) Applicant: SWUN CHYAN ENTERPRISES CO., LTD., Taichung (TW)

(72) Inventor: I-Chung Liao, Taichung (TW)

(73) Assignee: SWUN CHYAN ENTERPRISES CO., LTD., Taichung (TW)

( * ) Notice: Subject to any disclaimer, the term of this patent is extended or adjusted under 35 U.S.C. 154(b) by 230 days.

(21) Appl. No.: 15/482,705

(22) Filed: Apr. 7, 2017

(65) Prior Publication Data
US 2018/0292015 A1    Oct. 11, 2018

(51) Int. Cl.
*G05D 16/00* (2006.01)
*F16K 5/04* (2006.01)
*F16K 31/00* (2006.01)
*G01M 3/02* (2006.01)

(52) U.S. Cl.
CPC .......... *G05D 16/00* (2013.01); *F16K 5/0442* (2013.01); *F16K 31/001* (2013.01); *G01M 3/02* (2013.01)

(58) Field of Classification Search
CPC ....... F16K 5/0442; F16K 31/001; G01M 3/02
See application file for complete search history.

(56) References Cited

U.S. PATENT DOCUMENTS

| 1,618,307 | A | * | 2/1927 | Pieczonka | F16K 35/025 251/109 |
| 4,821,759 | A | * | 4/1989 | Diamond | F16K 17/36 137/45 |
| 6,792,967 | B1 | * | 9/2004 | Franklin | F16K 17/042 122/504 |
| 7,284,742 | B1 | * | 10/2007 | Rachels | F16K 1/16 251/251 |

(Continued)

FOREIGN PATENT DOCUMENTS

| CN | 203823077 U | 9/2014 |
| CN | 204083392 U | 1/2015 |

(Continued)

OTHER PUBLICATIONS

Office Action dated Jun. 19, 2017 of the corresponding Taiwan patent application.
Office Action dated Apr. 23, 2019 of the corresponding China patent application.

*Primary Examiner* — Craig M Schneider
*Assistant Examiner* — Angelisa L. Hicks
(74) *Attorney, Agent, or Firm* — HDLS IPR Services; Chun-Ming Shih

(57) ABSTRACT

A leak detector structure includes a base, a valve cylinder assembly, a rotary latch and an expansion member, the base includes a valve body, an inlet joint and an outlet joint, a receiving channel is defined in the valve body. The valve cylinder assembly includes a valve cylinder, a rotatable handle and a torsion spring, the valve cylinder is inserted in (Continued)

the receiving channel and connected with the rotatable handle, a communicating channel is defined in the valve cylinder, the communicating channel is operably passable or blocked with respect to the inlet joint and the outlet joint, and the torsion spring is fixed to the rotatable handle for pre-twisting. The rotary latch is pivotally connected to the base, and the rotary latch includes a snapping portion for engagement with the corresponding rotatable handle and a passive arm extended from the snapping portion.

6 Claims, 5 Drawing Sheets

(56) References Cited

U.S. PATENT DOCUMENTS 8,061,380 B1 * 11/2011 Martin .................... F16K 17/40
122/14.3

FOREIGN PATENT DOCUMENTS

| CN | 104976393 A | 10/2015 |
|----|-------------|---------|
| TW | M382470 U | 6/2010 |
| TW | M466232 U | 11/2013 |

* cited by examiner

LEAK DETECTOR STRUCTURE

BACKGROUND OF THE INVENTION

Technical Field

The present disclosure relates to a valve, and in particular, to a leak detector structure.

Description of Related Art

According to surveys made by World Health Organization, human diseases are highly related to drinking water in daily life. Accompanied with increasing population and development of industry, shortage of water supply is increasing in certain areas, drinking water source of some cities have been polluted, and drinking water safety for residents have been paid attention. Furthermore, dirt especially unneglectable *Escherichia coli* are stock in water pipe and water tower because of old tap water pipe or uncleaned water tower. Therefore, various water purifiers are developed by manufacturers and available to public.

Leak detectors are commonly installed in conventional water purifiers in order to detect water leakage or water seepage of the water purifier and further avoid damage to the floor, decorations and objects caused by flooding or water waste. Conventional leak detectors mostly include a valve body and a corresponding piston valve cylinder, and block leakage by linear motion of the valve cylinder in a channel defined in the valve body. However, failure of the linear motion of the valve cylinder tends to occur under a high pressure load, and the leak detector therefore fails to block leakage.

In views of this, in order to solve the above disadvantage, the present inventor studied related technology and provided a reasonable and effective solution in the present disclosure.

SUMMARY

It is a purpose of the present disclosure to provide a leak detector structure which includes a valve cylinder assembly and a rotary latch corresponding to each other, and is thereby stable, sensitive and durable.

In order to achieve the aforementioned purpose, a leak detector structure including a base, a valve cylinder assembly, a rotary latch and an expansion member is provided in the present disclosure, the base includes a valve body and an inlet joint and an outlet joint respectively communicating with the valve body, and a receiving channel is defined in the valve body. The valve cylinder assembly includes a valve cylinder, a rotatable handle and a torsion spring, an end of the valve cylinder is inserted in the receiving channel and the other end thereof is connected with the rotatable handle, a communicating channel is defined in the valve cylinder inserted in the receiving channel, the communicating channel could operably being passable or blocked with respect to the inlet joint and the outlet joint, and an end of the torsion spring is fixed with the rotatable handle and the rotatable handle is pre-twisted thereby. The rotary latch is pivotally connected to the base, and the rotary latch includes a snapping portion for engagement the corresponding rotatable handle and a passive arm extended from the snapping portion. The expansion member is installed corresponding to the passive arm for driving the rotary latch to swing.

In the present disclosure, the valve cylinder is rotated to be passable or blocked and thereby, a deviation problem is thereby avoided and reliable water blocking is further thereby achieved. The hard component leads to a better stability of a motion of the expansion member for driving the passive arm. According to the present disclosure, the rotatable handle is rotated to rotate the valve cylinder and the valve is thereby switched, and a larger torque is provided by a long arm. In addition, a 90 degree angle is formed between respective directions of the inlet and the outlet, and the valve could be easily switched to block water under a high pressure load by twisting the rotatable handle and the valve cylinder.

BRIEF DESCRIPTION OF DRAWING

The present disclosure can be more fully understood by reading the following detailed description of the embodiment, with reference made to the accompanying drawings as follows.

DETAILED DESCRIPTION

Detail descriptions and technical contains of the present disclosure are illustrated according to below embodiment drawings. However, the present disclosure should not be limited to the embodiment.

Figure 1:
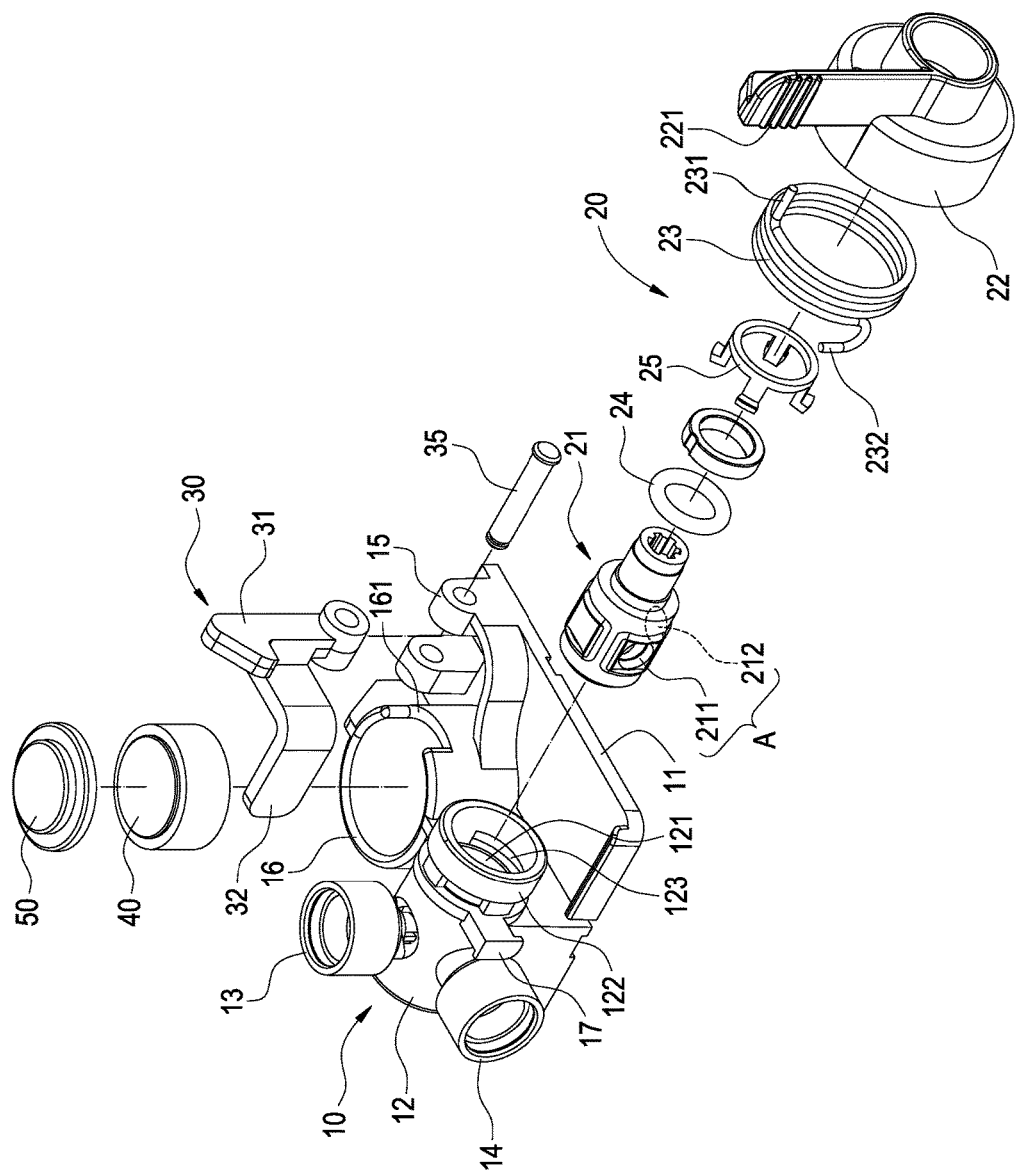
FIG. 1 is an exploded view showing the leak detector structure of the present disclosure.
Figure 2:
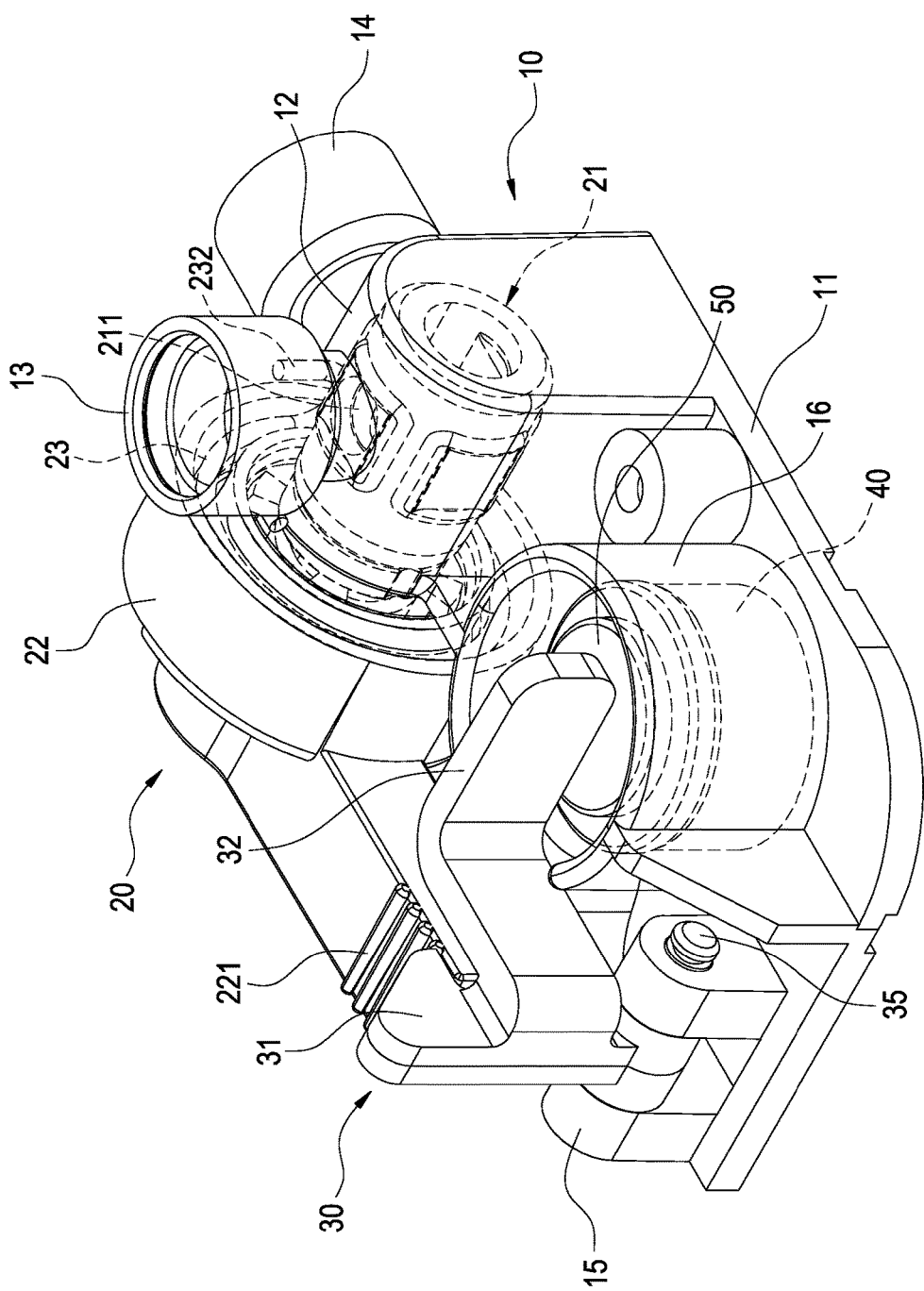
FIG. 2 is a perspective view showing the leak detector structure of the present disclosure.
Figure 3:
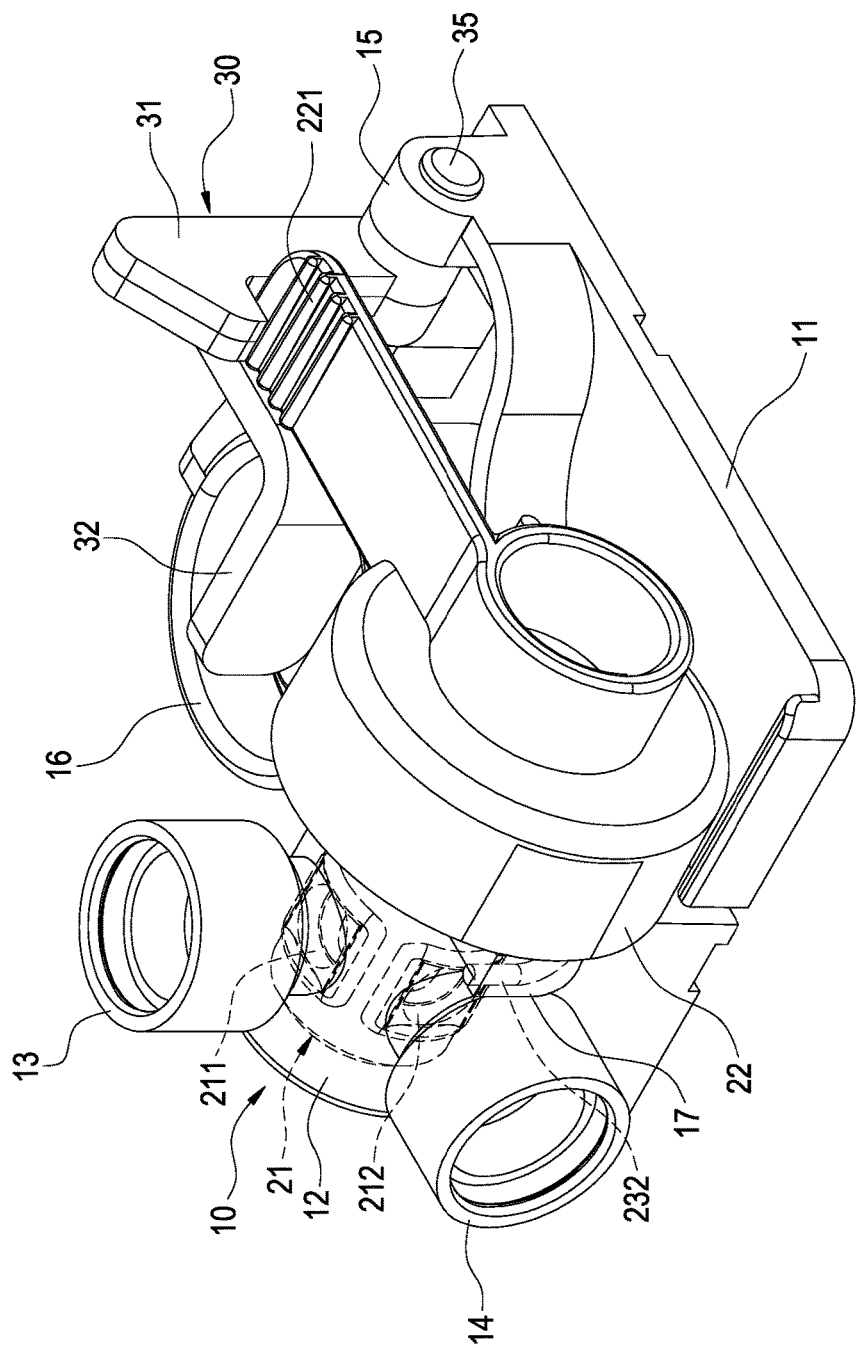
FIG. 3 is another perspective view showing the leak detector structure of the present disclosure.

According to FIGS. 1 to 3, a leak detector structure mainly including a base 10, a valve cylinder assembly 20, a rotary latch 30 and an expansion member 40 is provided in the present disclosure.

The base 10 includes a bottom plate 11 and a valve body 12 upward extended from a corner of the bottom plate 11, a receiving channel 121 is defined in the valve body 12, an inlet joint 13 extended from top of the valve body 12, an outlet joint 14 is extended from a side of the valve body 12, the inlet joint 13 and the outlet joint 14 are respectively communicated with the receiving channel 121, and a connecting joint 122 is additional extended from a side of the valve body 12 corresponding to position of the receiving channel 121. Moreover, a pivot seat 15 is upward extended from another corner of the bottom plate 11, and a hollow cylinder 16 is extended from a side of the pivot seat 15.

Furthermore, a stopper 17 extended from a side of the valve body 12 adjacent to the outlet joint 14, a snapping groove 123 is additionally defined nearby an end opening of the connecting joint 122. A notch 161 is defined on a side of the hollow cylinder 16 toward the pivot seat 15.

The valve cylinder assembly 20 includes a valve cylinder 21, a rotatable handle 22 and a torsion spring 23, an end of the valve cylinder 21 is inserted in receiving channel 121 through aforementioned connecting joint 122, the other end of the valve cylinder 21 is connected with the rotatable handle 22, an inlet 211 and an outlet 212 are defined on the valve cylinder 21 at portions inserted in the receiving channel 121, wherein the inlet 211 and the outlet 212 are communicated with each other and a communicating channel A of a "L" shape (90 degrees) is formed thereby, the communicating channel A is operably passive or blocked corresponding to the inlet joint 13 and the outlet joint 14. In normal status the inlet 211 is arranged corresponding to aforementioned inlet joint 13, the outlet 212 is arranged corresponding to aforementioned outlet joint 14, and a passive path is formed thereby. Multiple ribs 221 are formed on an end of the rotatable handle 22 far from the valve cylinder 21. The torsion spring 23 is arranged to sleeve an external edge of the connecting joint 122 of valve body 12 and hidden in the rotatable handle 22, the torsion spring 23 includes a first arm 231 and a second arm 232, the first arm 231 is fixed with the rotatable handle 22, the second arm 232 is fixed with the stopper 17, and the rotatable handle 22 is thereby pre-twisted by elastic force provided by the torsion spring 23.

In addition, the valve cylinder assembly 20 further includes an O-ring and a limiter 25, the O-ring and the limiter 25 are arranged to respectively sleeve the valve cylinder 21 and contained in the connecting joint 122, a hook of the limiter 25 is snapped in the snapping groove 123 of aforementioned connecting joint 122, and the aforementioned means archives waterproof and restricts the valve cylinder 21 to prevented from shedding.

The rotary latch 30 is pivotally connected to the pivot seat 15 of aforementioned base 10 by a pivot shaft 35, the rotary latch 30 includes a snapping portion 31 and a passive arm 32 extended from the snapping portion 31 and deflected toward a side thereof, wherein the snapping portion 31 is snapped with the corresponding to rotatable handle 22 for positioning and the snapping portion 31 of the present embodiment is snapped on the ribs 221 and thereby snapped and positioned more efficiently. The passive arm 32 is inserted in the hollow cylinder 16 through aforementioned notch 161.

The expansion member 40 could be a sponge substantially of a cylinder shape and installed in the hollow cylinder 16 of the base 10 corresponding to position of aforementioned passive arm 32. The expansion member 40 is able to expand while absorbs water and thereby drives the passive arm 32 to swing about a rotary center of the rotary latch 30, and the snapping portion 31 is therefore released from the rotatable handle 22.

Furthermore, the leak detector structure of the present disclosure further includes a hard component 50 arranged between the passive arm 32 and the expansion member 40 and thereby leads to a better stability of a motion of the expansion member for driving the passive arm.

Figure 4:
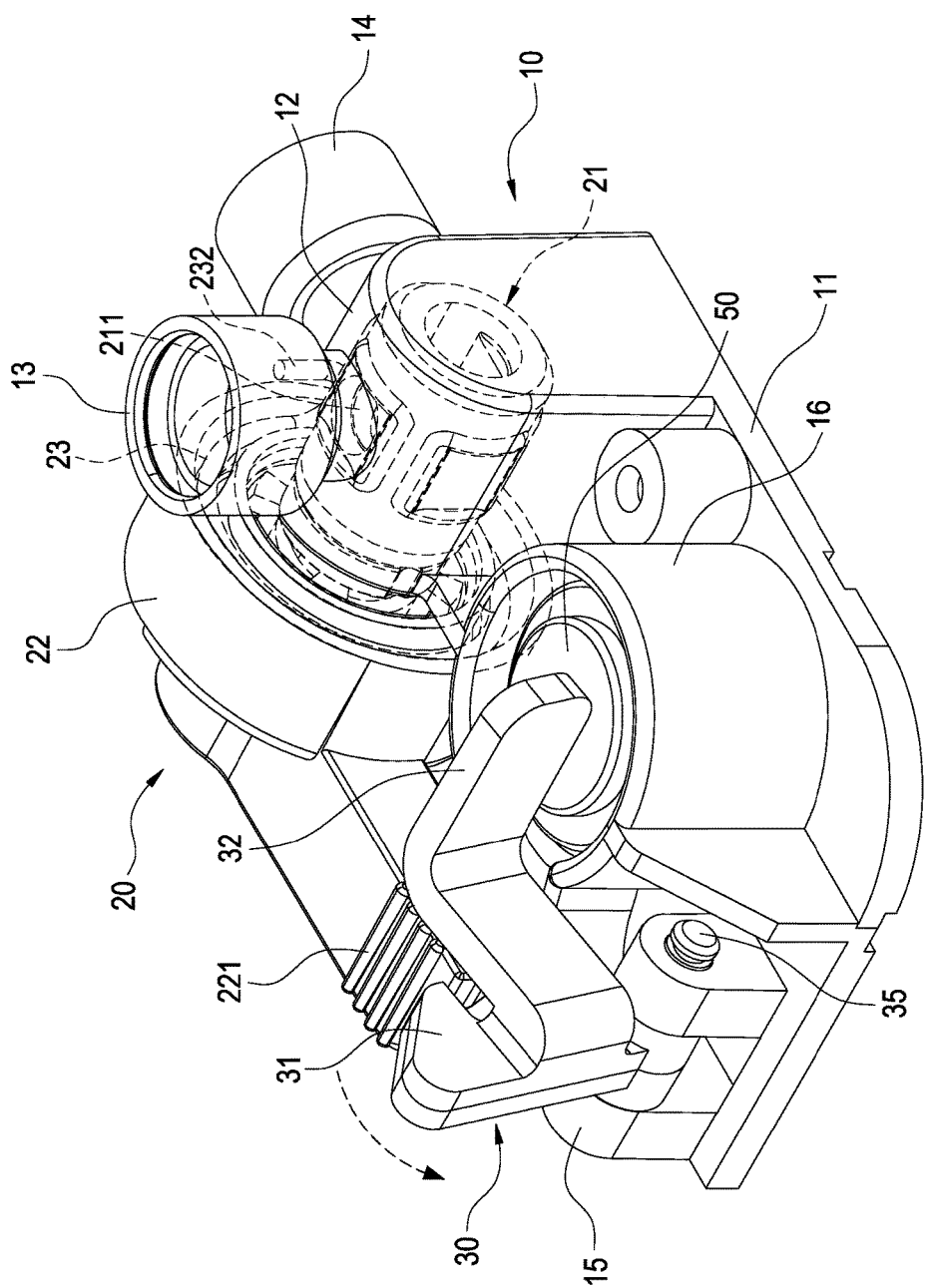
FIG. 4 is a schematic view showing operation of the leak detector structure the present disclosure.
Figure 5:
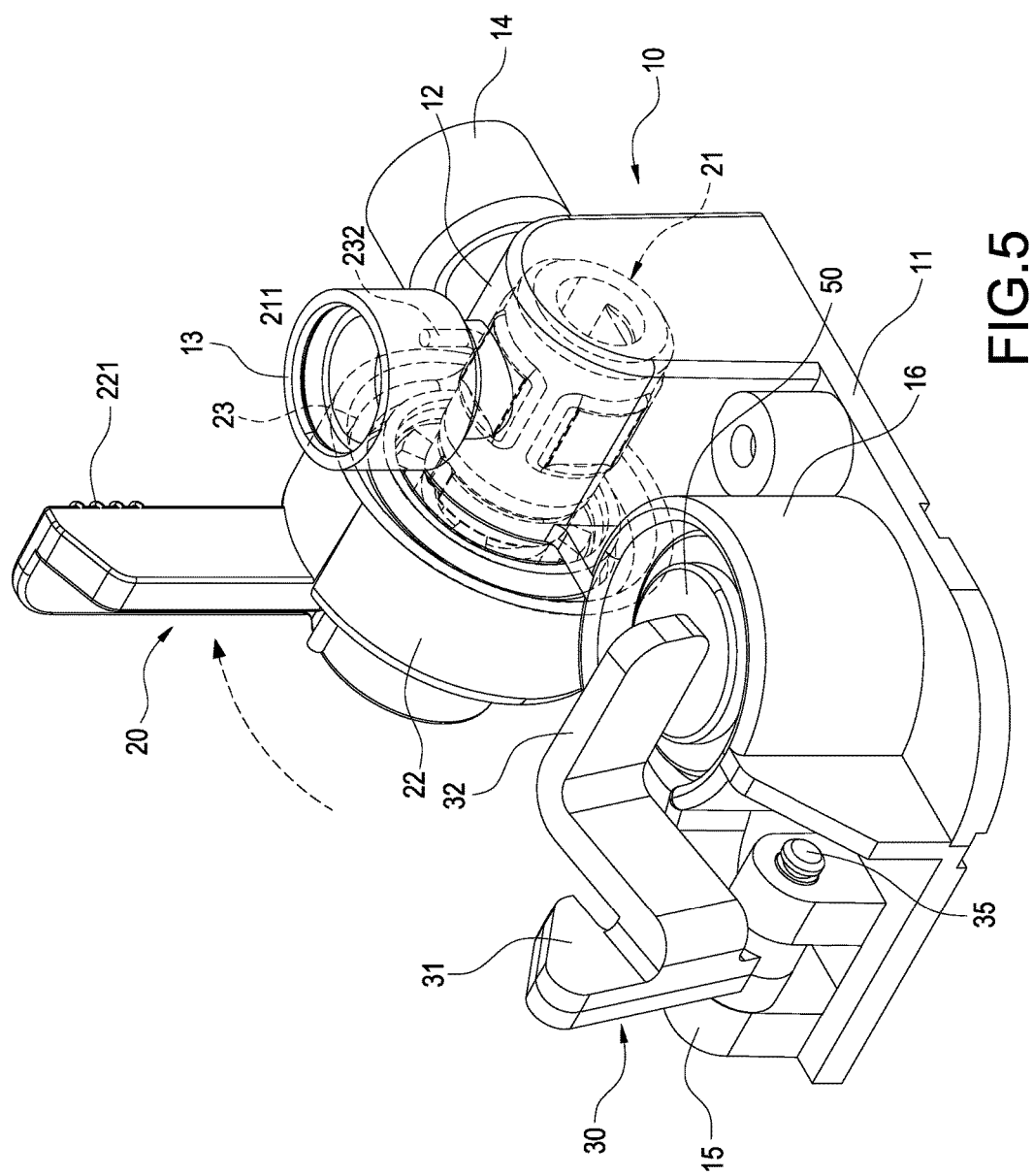
FIG. 5 is another schematic view showing operation of the leak detector structure the present disclosure.

According to assembly of aforementioned members shown in FIGS. 4 and 5, while leak water seeps into the hollow cylinder 16 under operation, the expansion member 40 absorbing water expands and deforms and further drives the passive arm 32 by the hard component 50 to swing counterclockwise about the rotary center of the rotary latch 30, and the snapping portion 31 is thereby released from the rotatable handle 22. Moreover, the torsion spring 23 provides a torque to the rotatable handle 22 to clockwise rotate the rotatable handle 22 and the valve cylinder 21 simultaneously, the inlet 211 is thereby rotated to leave the inlet joint 13 and further block leakage.

Accordingly, the leak detector structure of the present disclosure indeed achieves predetermined purpose and provides solutions for defects of conventional technology. The present disclosure is novel and inventive and therefore meets requirements of patentability. The applicant therefore filed the present application and here requests examination and grant to protect rights thereof.

What is claimed is:

1. A leak detector structure, comprising:
    a base comprising a valve body and an inlet joint and an outlet joint respectively communicating with the valve body, and a receiving channel being defined in the valve body;
    a valve cylinder assembly comprising a valve cylinder, a rotatable handle and a torsion spring, an end of the valve cylinder being inserted in the receiving channel and the other end thereof being connected with the rotatable handle, a communicating channel being defined on the valve cylinder inserted in the receiving channel, the communicating channel operably being passable or blocked with respect to the inlet joint and the outlet joint, an end of the torsion spring being fixed to the rotatable handle and the rotatable handle being thereby pre-twisted;
    a rotary latch pivotally connected to the base, the rotary latch comprising a snapping portion for engagement with the corresponding rotatable handle and a passive arm extended from the snapping portion; and
    an expansion member disposed corresponding to the passive arm for driving the rotary latch to swing;
    wherein the communicating channel consists of an inlet defined on the valve cylinder and an outlet communicating with the inlet;
    wherein the base comprising a bottom plate, a pivot seat is extended from the bottom plate, and the rotary latch is pivotally connected to the pivot seat by a pivot shaft;
    wherein a hollow cylinder is extended from a side of the pivot seat, and the expansion member is contained in the hollow cylinder;
    wherein a notch is defined at a side of the hollow cylinder, the passive arm is inserted in the hollow cylinder through the notch.

2. The leak detector structure according to claim 1, wherein the base comprising a bottom plate, the valve body is extended upward from the bottom plate, a connecting joint is extended from a side of the valve body corresponding to the receiving channel.

3. The leak detector structure according to claim 2, wherein the valve cylinder assembly further comprising an O-ring and a limiter, the O-ring and the limiter are arranged to sleeve the valve cylinder and are contained in the connecting joint.

4. The leak detector structure according to claim 1 further comprising a component arranged between the passive arm and the expansion member.

5. A leak detector structure, comprising:
    a base comprising a valve body and an inlet joint and an outlet joint respectively communicating with the valve body, and a receiving channel being defined in the valve body;
    a valve cylinder assembly comprising a valve cylinder, a rotatable handle and a torsion spring, an end of the valve cylinder being inserted in the receiving channel and the other end thereof being connected with the rotatable handle, a communicating channel being defined on the valve cylinder inserted in the receiving channel, the communicating channel operably being passable or blocked with respect to the inlet joint and the outlet joint, an end of the torsion spring being fixed to the rotatable handle and the rotatable handle being thereby pre-twisted;
    a rotary latch pivotally connected to the base, the rotary latch comprising a snapping portion for engagement with the corresponding rotatable handle and a passive arm extended from the snapping portion; and an expansion member disposed corresponding to the passive arm for driving the rotary latch to swing;

wherein the base comprising a bottom plate, the valve body is extended upward from the bottom plate, a connecting joint is extended from a side of the valve body corresponding to the receiving channel;

wherein the torsion spring is arranged to sleeve an external edge of the connecting joint and is hidden in the rotatable handle.

6. The leak detector structure according to claim 5, wherein a stopper is extended from a side of the valve body, the torsion spring comprises a first arm and a second arm, the first arm is fixed to the rotatable handle, the second arm is fixed to the stopper.

* * * * *